Patented Jan. 19, 1932

1,842,088

UNITED STATES PATENT OFFICE

FERDINAND EICHENBERGER, OF AARAU, SWITZERLAND, ASSIGNOR, BY MESNE ASSIGNMENTS, TO GLOBAR CORPORATION, OF NIAGARA FALLS, NEW YORK, A CORPORATION OF NEW YORK

ELECTRICAL RESISTANCE ELEMENT AND PROCESS OF PRODUCING THE SAME

No Drawing. Application filed January 30, 1923, Serial No. 615,933, and in Switzerland January 30, 1922.

The present invention relates to electrical resistance elements, especially those of a class adapted for use as electrical heating elements capable of producing and withstanding high temperatures in a commercially satisfactory manner. Electrical resistance elements, such as may be formed from silicon carbide as a base, by the process disclosed in Letters Patent of the United States, No. 1,420,980, granted to me, on June 27, 1922, are characterized by relatively high specific resistance and great durability under high temperature conditions.

In manufacturing heating elements, both commercially satisfactory and otherwise, from silicon carbide, such as is on the market in crystalline form, it has been the aim to produce as a final product, bars or bodies of silicon carbide as nearly pure as possible. For this purpose, such steps are taken and the temperatures are so regulated during the process of manufacture that the desired final product, in the form of a body of silicon carbide, is produced, even though the desired product must be formed in a mixture or composition by the influence of carbon upon elemental silicon.

If an element produced in this manner from silicon carbide is subjected to a high temperature, for instance, a temperature exceeding 1500° C., while exposed to the air, the material of the element oxidizes, probably through the action thereon of oxygen or carbonic acid of the air, and forms silicates. However, if the same material or element is heated in an atmosphere of silicon vapor which may be produced at about 3,000° C. in heating a mixture of quartz and carbon under the influence of the electric arc, then the body of silicon carbide is transformed to a greater or less degree to elemental silicon, depending upon the duration of this latter process.

Microscopic examinations of the product formed in accordance with this latter process have shown that the product includes crystals of silicon carbide embedded in elemental silicon. The number or amount of these crystals depends upon the duration of the heating process and decreases as the product more nearly or fully approaches elemental silicon. The material or product thus obtained is of much lower specific resistance than silicon carbide, and it is very hard and tough, and is generally of a substantially non-crystalline structure, except for the presence of embedded crystals of silicon carbide. This material is very well suited for the terminal portions of electrical heating elements which it is desired to maintain at a temperature lower than that of the main body of the heating element.

The silicon carbide base material may be transformed to substantially pure silicon, or it may be only partly transformed so as to include a variable amount of silicon carbide in crystalline form embedded in elemental silicon, depending upon the specific resistance required for the final product. A resistance element of silicon carbide may be thus transformed locally, that is, in any one or more portions, into the new product composed essentially of silicon carbide crystals mixed or associated with, as by embedding in, elemental silicon.

One very important utilization of the above described process is the production of a resistance element having a portion thereof, such as the main or body portion, of relatively high specific resistance and one or more other portions, such as may be used for contact or terminal portions, of relatively low specific resistance. With a resistance element of this character, one can be certain of no harmful or undesirable effects from heating of terminals or connections.

A resistance element having desired characteristics may be produced in accordance with my invention, from 10 parts by weight of silicon carbide, 4 parts by weight of calcium carbonate, 1 part by weight of iron oxide, and 4 parts by weight of graphite, these ingredients being finely powdered and thoroughly mixed, and a paste being formed which is pressed into a mold of the desired shape of the resistance element. The body thus formed and shaped, is embedded in a sand mixture which is practically non-fusible and is heated to a high temperature in a suitable furnace until the material is converted to a self-sustaining solid or hardened body having desired characteristics.

The silicon carbide body which is to be later locally siliconized in accordance with my process, may be made by various other processes employed for the making of shaped silicon carbide articles, particularly any of the usual processes in vogue for making heat hardened silicon carbide resistance rods, as, for example, the common process of making such rods by the recrystallization of silicon carbide, in which process a mixture of silicon carbide grain and a temporary binder is molded into the desired shape and then subjected to a high temperature which causes recrystallization of the silicon carbide into a hard, strong, self-bonded silicon carbide rod.

The portion or portions of the silicon carbide body at which it is desired to reduce the electrical resistance, as in the case of contact or terminal portions, are subjected, preferably while heated to a temperature at which silicon carbide readily absorbs silicon vapor, to an atmosphere of silicon vapor which is produced at about 3000° C. in heating a mixture of quartz and carbon under the influence of the electric arc, the parts treated being transformed to the required extent to a mixture of elemental silicon and silicon carbide, the latter being intimately associated with or embedded in crystalline form in the silicon, to produce material of the required specific resistance. Those portions of the resistance element which it is desired shall be substantially unchanged as to chemical composition during this step of the process are protected from the action of silicon vapor.

The local siliconizing treatment is preferably carried out in the case of electrical resistor rods, by embedding a number of silicon carbide resistor rods in loose end to end contact in a bed of silica sand and powdered coke, and passing an electric current through the rods in series. Electric arcs are produced between the ends of the rods. The mixture of sand and coke at the ends of the rods is subjected to the high arc temperature, and silicon vapor is produced which penetrates into the pores of the adjacent ends of the rods and is deposited therein, producing siliconized end contact portions which, because of their increased electrical conductivity, remain relatively cool compared with the body of the rod when in use. This is known in shop parlance as "cold ending" the rods.

The resultant product of this process may be in the form of a resistance or heating element having a body portion essentially of silicon carbide, and one or more contact or terminal portions essentially of a mixture of silicon carbide and elemental silicon. These contact or terminal portions are thus of relatively low resistance and permit ready connection of the resistance or heating element to a power circuit with little danger of undesirable high temperatures at the electrical connections. Resistance elements produced in accordance with the present invention are characterized by the ability to sustain themselves in operative condition with little or no deformation or deterioration when subjected to long continued heating at temperatures in excess of 1,000° C.

It should be understood that the invention claimed is not limited to the specific details of production and characteristics herein specifically described, for obvious modifications within the scope of the invention will be apparent to persons skilled in the art to which this invention relates.

It is claimed and desired to secure by Letters Patent:

1. The step in the process of manufacturing resistance material, which comprises subjecting a portion only of a shaped body containing silicon carbide as an essential constituent to heating in an atmosphere of silicon vapor at temperatures at which silicon carbide readily absorbs silicon vapor, whereby said portion exceeds in electrical conductivity the portions not so exposed.

2. The process of providing low resistance terminals for silicon carbide rods which comprises subjecting said terminals to an atmosphere of silicon vapor produced by heating a mixture of silica and carbon by means of an electric arc to produce silicon vapor which penetrates said terminals, whereby the conductivity of the terminals is made greater than that of the body of the resistor rod.

3. A self-sustaining heat hardened resistance element having a body portion composed substantially of silicon-carbide and terminal portions consisting substantially of silicon carbide in the form of crystals embedded in elemental silicon, said elemental silicon being formed in situ by subjecting the silicon carbide of the terminal portions to silicon vapor at temperatures at which silicon is readily absorbed by silicon carbide.

4. A silicon carbide heating element in which the terminal portions are impregnated with metallic silicon, whereby said terminal portions operate at a lower temperature than the body of the resistor.

In witness whereof, I affix my signature hereto.

FERDINAND EICHENBERGER.